United States Patent [19]

Aratani et al.

[11] Patent Number: 4,878,132
[45] Date of Patent: Oct. 31, 1989

[54] THERMOMAGNETIC RECORDING METHOD APPLYING POWER MODULATED LASER ON A MAGNETICALLY COUPLED MULTI-LAYER STRUCTURE OF PERPENDICULAR ANISOTROPY MAGNETIC FILM

[75] Inventors: Katsuhisa Aratani, Chiba; Ariyoshi Nakaoki, Tokyo; Tomiji Tanaka, Saitama, all of Japan

[73] Assignee: Sony Corporation, Tokyo, Japan

[21] Appl. No.: 184,783

[22] Filed: Apr. 22, 1988

[30] Foreign Application Priority Data

Apr. 24, 1987 [JP] Japan ................................ 62-101251
Apr. 27, 1987 [JP] Japan ................................ 62-103874

[51] Int. Cl.$^4$ ........................ G11B 5/62; H01F 10/00
[52] U.S. Cl. ...................................... 360/59; 369/13; 360/114
[58] Field of Search ............... 369/13; 360/114, 59; 365/122, 10, 32

[56] References Cited

U.S. PATENT DOCUMENTS 4,649,519  3/1987  Sun et al. ........................... 365/122

FOREIGN PATENT DOCUMENTS 0180459  5/1986  European Pat. Off. .
0192256  8/1986  European Pat. Off. .
0210855  2/1987  European Pat. Off. .
2546655  5/1984  France .

Primary Examiner—Vincent P. Canney
Assistant Examiner—Kevin J. Fournier
Attorney, Agent, or Firm—Hill, Van Santen, Steadman & Simpson

[57] ABSTRACT

A thermomagnetic recording method is disclosed using a thermomagnetic recording medium where first, second and third magnetic thin films each formed of rare-earth and transition metals are sequentially superposed to form layers in a magnetically coupled manner. The recording is carried out by heating the thermomagnetic recording medium under a predetermined magnetic field perpendicular to the film plane thereof while selectively modulating, in accordance with data to be recorded, a first heating state at a first temperature T1 substantially above the Curie point Tc1 of the first magnetic thin film and adequate to hold the sublattice magnetization of the transition metal of the second magnetic thin film in a predetermined direction, and a second heating state at a second temperature T2 substantially above the Curie point Tc1 and adequate to invert the sublattice magnetization of the transition metal of the second magnetic thin film to the reverse of the predetermined direction. In a cooling step subsequent to the first and second heating states, maintaining the sublattice magnetization of the third magnetic thin film in a predetermined direction while orienting the sublattice magnetization of said second magnetic thin film to be directionally coincident with that of the third magnetic thin film at a temperature below the first temperature T1 without directionally inverting the sublattice magnetization of the first magnetic thin film.

6 Claims, 8 Drawing Sheets

THERMOMAGNETIC RECORDING METHOD APPLYING POWER MODULATED LASER ON A MAGNETICALLY COUPLED MULTI-LAYER STRUCTURE OF PERPENDICULAR ANISOTROPY MAGNETIC FILM

BACKGROUND OF THE INVENTION

The present invention relates to a thermomagnetic recording method employing, for example, irradiation of a laser light beam on a perpendicular anisotropy magnetic film.

In the thermomagnetic recording method which records data on a recording medium where data bits (magnetic domains) are read out by magneto-optical interaction, the recording medium having a perpendicularly magnetizable thin film is initialized by previously orienting the magnetization in one direction perpendicular to the film plane, and bits having perpendicular magnetization reverse to such direction are formed by local heating with irradiation of a laser light beam or the like, whereby binary-coded data are recorded.

In the thermomagnetic recording method, a time is required for erasure of the recorded data (corresponding to the above-described initialization) executed before rewriting the data, so that it is impossible to realize a fast recording operation at a high transfer rate or in other words a realtime overwriting. With regard to this point, there are proposed a variety of recording methods with an overwrite function which eliminates the necessity of such independent erasure time. Out of the known overwrite type thermomagnetic recording methods, the most promising one is a system adopting modulation of an external magnetic field to a recording medium, and another is a two-head system using an erasing head in addition to a recording head. According to the former system with external magnetic field modulation, as disclosed in Japanese Patent Laid-Open No. 60-48806 for example, a recording operation is performed by applying a magnetic field, which is so poled as to correspond to the state of an input digital signal current, to a heating-beam irradiation area on a recording medium with an amorphous ferrimagnetic thin film having an axis of easy magnetization perpendicular to its film plane.

In performing a fast recording operation at a high data transfer rate with such external magnetic field modulation mentioned, it requires an electromagnet operable at a frequency on the order of MHz, and there exist considerable difficulties in production of such electromagnet. Even if the production is technically possible, there still remain some problems with respect to great power consumption and excessive generation of heat to eventually bring about an impediment to practical use. Meanwhile in the two-head system, an additional head is required and the two heads need to be spaced apart from each other, hence imposing a great burden on the drive mechanism with an economical disadvantage and nonadaptability to mass production.

RELATED APPLICATION

In an attempt to solve the above-described problems, it has been proposed to rewrite or overwrite the data with facility merely by selectively controlling the temperature in heating the recording medium with a laser light beam or the like by the present inventors.

The present applicant previously proposed an improved thermomagnetic recording method contrived to solve the above problems, in U.S. patent application Ser. No. 87440, filed on Aug. 20, 1987. The thermomagnetic recording method disclosed therein uses a thermomagnetic recording medium of a laminated structure composed of first and second magnetic thin films of rare-earth and transition metals, and heats the recording medium under a required first external magnetic field while selectively modulating, in accordance with data such as binary "0" and "1" to be recorded, a first heating state at a first temperature T1 substantially above the Curie point Tc1 of the first magnetic thin film but not sufficiently high to invert the sublattice magnetization of the second magnetic thin film, or a second heating state at a second temperature T2 above the Curie point Tc1 and adequate to invert the sublattice magnetization of the second magnetic thin film. Subsequently in a cooling step, the sublattice magnetization of the first magnetic thin film is oriented to be directionally coincident with that of the second magnetic thin film by exchange coupling force between the first and second magnetic thin films, thereby forming "0" and "1" recorded bits (magnetic domains) in the first magnetic thin film. And the sublattice magnetization of the second magnetic thin film is inverted by a second external magnetic field or the aforesaid first external magnetic field at room temperature with the composition of the second magnetic thin film so selected that its compensation temperature is existent between the room temperature and the second temperature T2, hence achieving an overwritable condition.

The above method realizes a high data transfer rate without requiring any particular step (time) for erasure and solves the known problems in the aforementioned two-head system or external magnetic field modulation system.

OBJECT OF THE INVENTION

It is an object of the present invention to provide an improved thermomagnetic recording method capable of realtime overwriting data.

It is another object of the present invention to provide a thermomagnetic recording method using a power modulated laser beam by using smaller external magnetic field.

It is a further object of the present invention to provide a thermomagnetic recording method using a power modulated laser beam irradiating on a multilayer magnetically coupled recording medium.

It is a still further object of the present invention to provide a thermomagnetic recording method using a power modulated laser beam in which an external magnetic field used to initialize a magnetic recording medium maybe made small or be omitted.

DESCRIPTION OF THE PREFERRED EMBODIMENTS

Figure 2:
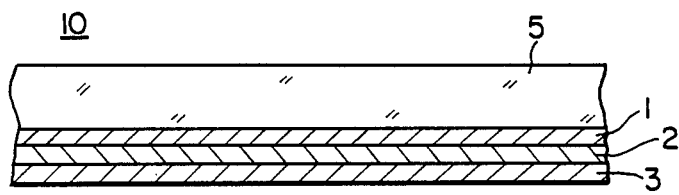
FIG. 2 shows basic structure of a thermomagnetic recording medium used in the invention.

In a thermomagnetic recording medium 10 employed in the present invention, as illustrated in its sectional view of FIG. 2, at least first, second and third magnetic thin films 1, 2 and 3 are sequentially superposed on a light transmissive base 5 to form layers in a magnetically coupled manner. Each of the first, second and third magnetic thin films 1, 2 and 3 is composed of a perpendicularly magnetizable film of rare-earth and transition metals.

In the present invention, the procedure is executed by heating the thermomagnetic recording medium 10 under an external magnetic field Hex perpendicular to the film plane thereof while selectively modulating, in accordance with data to be recorded, a first heating state at a first temperature T1 substantially above the Curie point Tc1 of the first magnetic thin film 1 and adequate to hold the sublattice magnetization of the transition metal of the second magnetic thin film 2 in a predetermined direction (hereinafter referred to as positive direction), or a second heating state at a second temperature T2 substantially above the Curie point Tc1 and adequate to invert the sublattice magnetization of the transition metal of the second magnetic thin film 2 to the opposite direction (hereinafter referred to as inverse direction); and in a cooling step subsequent to such first and second heating states, maintaining the sublattice magnetization of the third magnetic thin film in the positive direction while orienting the sublattice magnetization of the second magnetic thin film to be directionally coincident with that of the third magnetic thin film without directionally inverting the sublattice magnetization of the first magnetic thin film.

The first and second heating states can be obtained by modulating, in accordance with the data to be recorded, the intensity or irradiation time of a heating beam such as laser light beam to the thermomagnetic recording medium 10.

According to the above-described method of the present invention, data can be recorded in the form of a direction of the sublattice magnetization of the transition metal in the first magnetic thin film 1 merely by modulating, in accordance with such data, the heating beam irradiated to obtain the first or second heating state. And in the recording mode, the directions of sublattice magnetizations in the second and third magnetic thin films 2 and 3 are so oriented as to become coincident with those in the initial state anterior to recording the data on the magnetic recording medium, so that an overwritable condition adapted for recording next data is achieved merely by providing the first or second heating state in accordance with the next data.

For reading out or reproducing the recorded data from the thermomagnetic recording medium, a linear polarized light beam is irradiated to the first magnetic thin film 1 and, for example, a binary "0" or "1" representing the positive or inverse direction of the sublattice magnetization of the transition metal TM in the first magnetic thin film 1 is read out by detecting the Kerr rotation angle or the like based on the interaction of the light beam and the magnetization.

In a thermomagnetic recording medium 10 employed in further embodiments of the present invention, similar to the illustration in FIG. 2, at least first and second magnetic thin films 1 and 2 are superposed on a light transmissive base 5 to form layers, and the second magnetic thin film 2 comprises superposed layers of first and second film parts $2_1$ and $2_2$. The first magnetic thin film 1 and the second magnetic thin film 2 consisting of its first and second film parts $2_1$ and $2_2$ are composed individually of perpendicularly magnetizable films of rare-earth (RE) and transition metals (TM).

In the second magnetic thin film 2, the first film part $2_1$ having a first Curie point $Tc2_1$ is disposed adjacent to the first magnetic thin film 1, and the second film part $2_2$ having a second Curie point $Tc2_2$ lower than the first Curie point $Tc2_1$ is disposed on the reverse side with respect to the first film part $2_1$. Such first and second film parts are both so composed as to deviate toward the same side from the compensational composition at the normal temperature. That is, the two film parts $2_1$ and $2_2$ are formed to have TM-rich characteristic as TM sublattice dominant films or to have RE-rich characteristic as RE sublattice dominant films at the normal temperature.

In further embodiments of the present invention, the procedure is executed by heating the thermomagnetic recording medium 10 under an external magnetic field Hex perpendicular to the film plane thereof while selectively modulating, in accordance with data to be recorded, a first heating state at a first temperature T1 substantially above the Curie point Tc1 of the first magnetic thin film 1 and adequate to hold the sublattice magnetization of the transition metal of the second magnetic thin film 2 in a predetermined direction (hereinafter referred to as positive direction), or a second heating state at a second temperature T2 substantially above the Curie point Tc1 and adequate to invert the sublattice magnetization of the transition metal of the second magnetic thin film 2 to the opposite direction (hereinafter referred to as inverse direction); and in a cooling step subsequent to such first and second heating states, orienting the respective sublattice magnetizations of both parts of the second magnetic thin film in the same state.

The first and second heating states can be obtained by modulating, in accordance with the data to be recorded, the intensity or irradiation time of a heating beam such as laser light beam to the thermomagnetic recording medium 10.

According to the above-described method of the present invention, data can be recorded in the form of a direction of the sublattice magnetization of the transition metal in the first magnetic thin film merely by modulating, in accordance with such data, the heating beam irradiated to obtain the first or second heating state. And in the recording mode, the directions of magnetizations in the second magnetic thin film 2 are so oriented as to become coincident with those in the initial state anterior to recording the data on the magnetic recording medium, so that an overwritable condition adapted for recording next data is achieved merely by providing the first or second heating state in accordance with the next data.

For recording out or reproducing the recorded data from the thermomagnetic recording medium, a linear polarized light beam is irradiated to the first magnetic thin film 1 and, for example, a binary "0" or "1" representing the positive or inverse direction of the sublattice magnetization of the transition metal TM in the first magnetic thin film 1 is read out by detecting the Kerr rotation angle or the like based on the interaction of the light beam and the magnetization.

(a) Thermomagnetic recording medium

Figure 3:
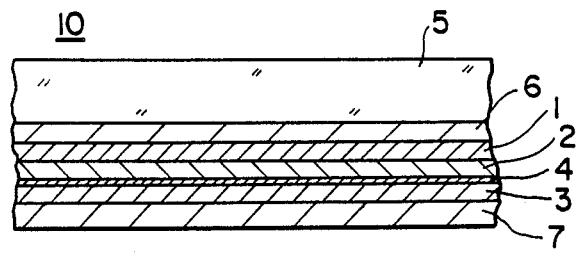
FIG. 3 is a sectional view showing an exemplary specific structure of the thermomagnetic recording medium.

The thermomagnetic recording medium 10 used in the present invention is basically so constituted as illustrated in FIG. 3, wherein first, second and third magnetic thin films 1, 2 and 3 are deposited on one surface of a light transmissive base 5 of a glass plate, acrylic plate or the like through a transparent dielectric film 6 serving as a protective or interference film, and further a protective film 7 of a nonmagnetic metal or dielectric material is deposited thereon. However, it is possible in this thermomagnetic recording medium 10 to dispense with such dielectric film 6 and the protective film 7.

The thermomagnetic recording medium 10 employed in the embodiments 1 and 2, which will be described later, has a structure of FIG. 3 where a fourth magnetic thin film 4 is interposed between the second magnetic thin film 2 and the third magnetic thin film 3.

In such magnetic thin films 1 to 3 or 1 to 4, the mutually adjacent ones are magnetically coupled to each other by the exchange force.

The dielectric film 6, the magnetic thin films 1 to 4 and the protective film 7 constituting the recording medium 10 can be formed by vacuum evaporation or sputtering technique.

The magnetic thin films 1 to 4 may be composed of a variety of magnetic materials. For example, there is available an amorphous alloy $REx\ TM1-x$ which includes one or more rare-earth metals (RE) such as Nd, Sm, Gd, Tb, Dy and Ho where $x=10$ to 40 atomic percent, and one or more transition metals (TM) such as Cr, Mn, Fe, Co, Ni and Cu where $1-x=90$ to 60 atomic percent. And a small amount of some other element ma be added thereto. In this RE-TM amorphous alloy of magnetic metals, except the case where RE is Nd or Sm, the magnetic moment of RE and that of TM are coupled in antiparallel with each other to consequently present so-called ferrimagnetism, and the net magnetization is the difference between the respective sublattice magnetizations of RE and TM (sum of the respective sublattice magnetizations in view of the positive and negative values depending on the directions of magnetizations). In case the rare-earth (RE) is composed of either or both of Nd and Sm, the magnetic moment of RE and that of TM are coupled in parallel with each other to present so-called ferromagnetism. In this case, the net magnetization is the sum of the respective sublattice magnetizations of RE and TM.

(b) States of magnetization

In the thermomagnetic recording medium 10, data such as binary "0" and "1" are recorded in the form of positive and inverse directions of the sublattice magnetizations of TM in the first magnetic thin film 1, as mentioned previously. With respect to the first magnetic thin film 1 and the second magnetic thin film 2 coupled thereto by the exchange force, the states of magnetization obtainable at the respective Curie points Tc1 and Tc2 are classified into A through D illustrated in FIG. 4, where the respective directions of the TM spin and the RE spin are typically shown by arrowed solid lines and broken lines in regard to the first and second magnetic thin films 1 and 2. The axes of easy magnetization in both thin films 1 and 2 are supposed here to be perpendicular to the film plane, but the requisite is satisfied if merely one of them is adapted for perpendicular magnetic recording.

Figure 4:
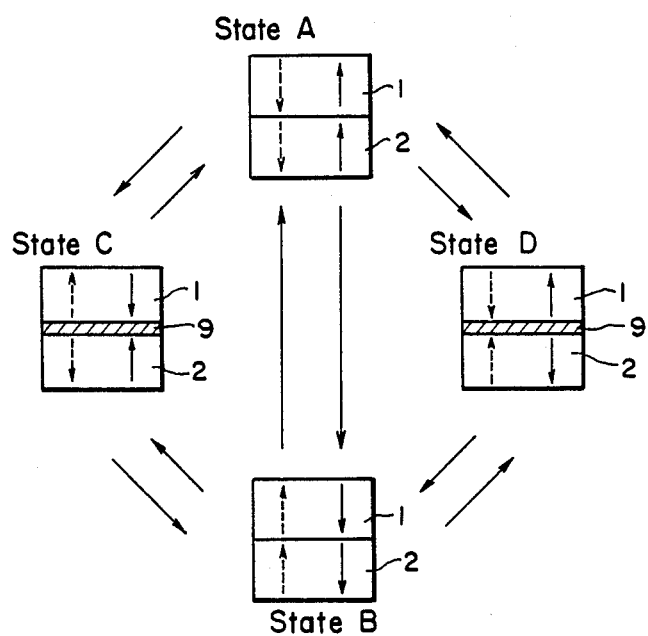
FIG. 4 illustrates transitions among the states of magnetization.

In FIG. 4, the states A and B represent a case where the TM spins corresponding to the respective magnetic moments of TM in the first and second magnetic thin films 1 and 2 or the RE spins corresponding to the respective magnetic moments of RE therein are mutually in the same direction. In contrast therewith, the states C and D in FIG. 4 represent a case where the respective magnetic moments of TM and RE in the first and second magnetic thin films 1 and 2 are mutually in the opposite directions and, in the vicinity of the interface between the two layers, there exists an interface magnetic wall 9 where the magnetic moments of TM and RE are directionally changed by 180°. And interface magnetic wall energy ($\sigma\omega$ erg/cm$^2$ per unit area) is stored in this region.

(c) Apparatus for carrying out thermomagnetic recording

Figure 5:
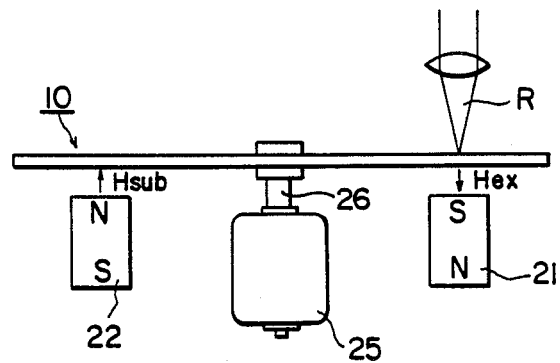
FIG. 5 schematically shows the constitution of a recording apparatus.

As illustrated in FIG. 5, for example, recording/reproducing laser light R is incident upon the thermomagnetic recording medium 10, which is in the shape of a disk or the like, from its one side with the light transmissive base 5 shown in FIG. 3. Meanwhile magnetic fields Hex and Hsub generated by a magnet 21 and, if necessary, another magnet 22 are applied to the recording medium 10 from its side with the protective film 7 or the base 5. Although the magnets 21 and 22 are spaced apart from each other in FIG. 5, they may be disposed mutually adjacent. In case the magnetic field Hsub is not required as will be described later, the disk-shaped thermomagnetic recording medium 10 is driven by a rotary shaft 26 of a drive motor 25 in a structure without the magnet 22. The power of the laser light R is modulated in accordance with the data to be recorded, so as to heat the light-irradiated portion of the recording medium 10 at the first or second temperature T1 or T2.

(d) Embodiment 1

Figure 1:
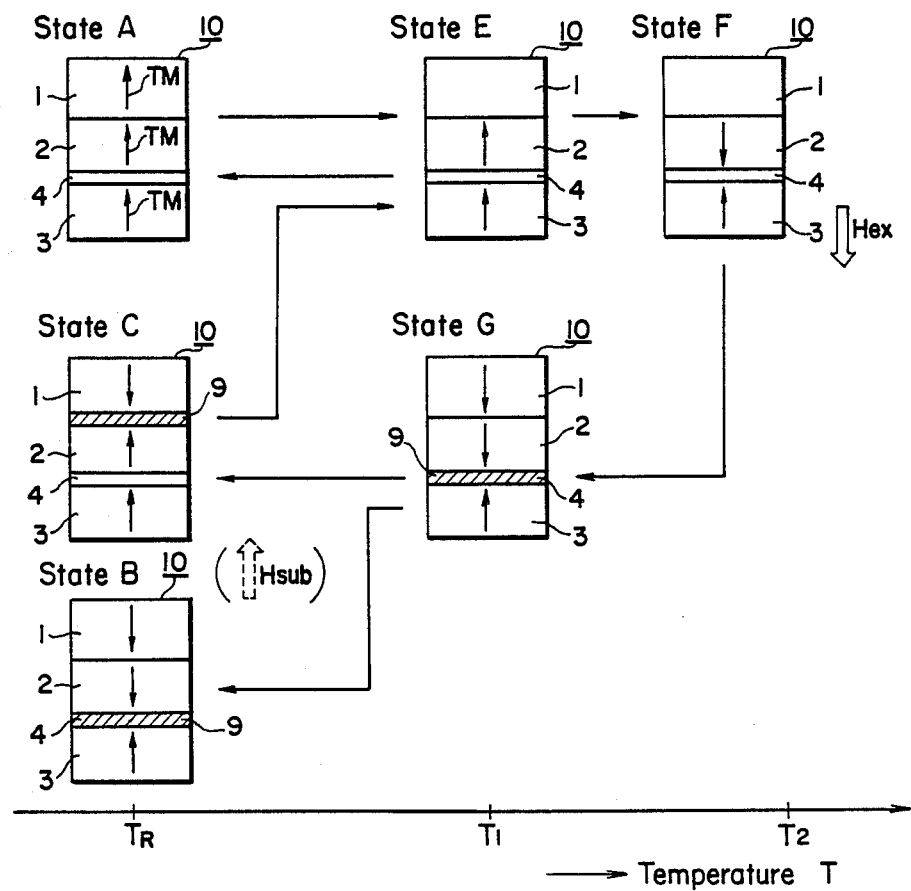
FIGS. 1, 7, 9, 11, 12 and 14 show the charts illustrating recording processes according to the present invention.

FIG. 1 illustrates how the state of magnetization changes in compliance with the temperature in an embodiment of the present invention, and FIG. 3 schematically shows the sectional structure of the recording medium 10 used in the embodiment. The thermomagnetic recording medium 10 for use in this embodiment is so constituted that, as mentioned previously, a fourth magnetic thin film 4 is interposed between the second magnetic thin film 2 and the third magnetic thin film 3. In this embodiment, the magnetic thin films 1 to 4 are composed of ferrimagnetic TM-RE alloy.

Such magnetic thin films 1 to 4 are deposited on the light transmissive base 5 directly by the use of a DC magnetron sputtering apparatus without forming a dielectric film 6, so that sequential layers of RE-TM ferrimagnetic thin films are obtained by sputtering. Such magnetic thin films 1 to 4 are so arranged that RE and TM layers are superposed alternately. And a protective film 7 composed of $Si_3N_4$, AlN, $SiO_2$, SiO or $MgF_2$ is deposited to a thickness of 800 Å on the uppermost third magnetic thin film 3.

The first and second magnetic thin films 1 and 2 of the recording medium 10 in this embodiment are so-called TM-rich films where TM sublattice magnetization is dominant in a range from room temperature to the respective Curie points Tc1 and Tc2. Meanwhile the third magnetic thin film 4 is a so-called RE-rich film where RE sublattice magnetization is dominant in a range from room temperature to the aforementioned heating temperature T1.

In the first to fourth magnetic thin films 1 to 4, the respective Curie points Tc1 to Tc4 are so selected as to have the following relationship:

$$Tc1 < Tc2 \quad (1)$$

$$Tc4 < Tc2, Tc3 \quad (2)$$

$$Tc4 < Tc1 \quad (3)$$

The thickness of the fourth magnetic thin film 4 is selected to be as small as 100 Å adequate to interrupt the exchange force, which is exerted between the second and third magnetic thin films 2 and 3, at a temperature above the Curie point Tc4 of the fourth magnetic thin film 4.

In the description of this embodiment 1, as illustrated in FIG. 1, data are recorded by forming a portion of state A and a portion of state C or B in the thermomagnetic recording medium 10 shown in FIG. 4, i.e., a positive-direction portion and an inverse-direction portion with regard to the TM spins in the first magnetic thin film 1. In FIG. 1, the arrows relative to the thin films 1 to 3 typically indicate the directions of the TM spins, and the magnetizations Ms1 to respectively to the difference between the TM and RE magnetic moments in the thin films 1 to 4 in case they are ferrimagnetic ones.

It is assumed in this example that initially the first and second magnetic thin films 1 and 2 are in the state A where the respective TM spins are both in the positive direction, and the TM spin in the third magnetic thin film 3 is in the same direction as in the first and second magnetic thin films 1 and 2.

Suppose now that the temperature T is raised to the first temperature T1 or the second temperature T2 from the initial state A at room temperature TR. The first temperature T1 is above the Curie point Tc1 of the first magnetic thin film 1 but is not so high as to invert the magnetization of the second magnetic thin film 2 with application of an external magnetic field Hex which will be described later. The second temperature T2 is above the first temperature T1 and high enough to invert the TM sublattice magnetization of the film 2 with application of the external magnetic field Hex, namely near or substantially higher than the Curie Tc2 of the second magnetic thin film.

After completion of the heating step at such temperature T1 or T2, a magnetization emerges in the first magnetic thin film 1 upon fall of the temperature T below the Curie point Tc1, and with regard to determination of the direction of such magnetization, the exchange coupling force exerted between the magnetic thin films 1 and 2 becomes dominant. That is, the saturation magnetization Ms1 and the thickness h1 of the first magnetic thin film 1 relative to the external magnetic field Hex and the interface magnetic wall energy $\sigma\omega 1$ are so selected as to substantially satisfy the following conditions at the temperature T (proximate to Tc1) where a spontaneous magnetization emerges in the first magnetic thin film 1:

$$\sigma\omega > 2|Ms1|h1 \, Hex \quad (5)$$

Then the state of magnetization caused upon fall of the recording medium temperature T below the Curie point Tc1 is such that the TM sublattice magnetizations in the first and second magnetic thin films 1 and 2 are directionally coincident with each other a in the state A or B illustrated in FIG. 4. And the state A is obtained when the temperature in the heating step is T1, or the state B is obtained when the temperature is T2.

The state of in FIG. 1 shows a state where the magnetization of the first magnetic thin film 1 disappeared with rise of the recording medium temperature T up to the first temperature T1. And upon fall of the temperature T substantially below the Curie point Tc1 of the first magnetic thin film 1 in the subsequent cooling step, the TM sublattice magnetization of the first magnetic thin film 1 is oriented to be directionally coincident with that of the second magnetic thin film 2 by the exchange coupling force with the film 2 as described previously, so that the initial state A in FIG. 1 is obtained to form a recorded portion of, e.g., binary data "0". The state F in FIG. 1 is obtained when the magnetizations of the first and second magnetic thin films 1 and 2 ar once erased or reduced due to rise of the temperature T up to the second temperature T2 and the TM sublattice magnetization of the second magnetic thin film 2 is inverted by the external magnetic field Hex. In this case, since the exchange force between the second and third magnetic thin films 2 and 3 is interrupted by the existence of the fourth magnetic thin film 4 which is nonmagnetic film at the second temperature T2 higher than Tc4, the TM sublattice magnetizations of the two films 2 and 3 can be directionally opposite to each other as shown in the state F. And with further fall of the temperature T to the vicinity of the Curie point Tc1 of the first magnetic thin film 1, the TM sublattice magnetization, which is in the inverse direction as in the second magnetic thin film 2, is generated in the first magnetic thin film 1 by the exchange coupling force with the second magnetic thin film 2, as shown in the state G. In the fourth magnetic thin film 4 interposed between the second and third magnetic thin films 2 and 3, an interface magnetic wall 9 is generated as the sublattice magnetizations of the second and third magnetic thin films 2 and 3 are rendered directionally opposite to each other. And when the temperature T further falls in the cooling step to the room temperature TR from the state G, the state B or C is obtained under the conditions set according to Eqs. (12) and (13) which will be described later. In this stage, the TM sublattice magnetization of the first magnetic thin film 1 is directionally inverted to record, e.g., binary data "1".

In case the state C is obtained, it signifies that an interface magnetic wall 9 is generated between the first and second magnetic thin films 1 and 2 as the respective TM sublattice magnetizations corresponding to the TM spins become directionally opposite to each other.

A transition of the state G to either the state B or the state C is determined by the following conditional equation, where h2, h3 and h4 are the thicknesses of the second, third and fourth magnetic thin films 2, 3 and 4, respectively; Ms2, Ms3 and Ms4 are the magnetizations thereof, respectively; and Hc2, Hc3 and Hc4 are the coercive forces thereof, respectively. In calculation, there exists the relationship of $h4 << h2, h3$; and $Ms4 \cdot Hc4 << Ms2 \cdot Hc2, Ms3 \cdot Hc3$. Besides the above, $\sigma\omega 1$ represents the interface magnetic wall energy between the first and second magnetic thin films 1 and 2; and $\sigma\omega 2$ represents the interface magnetic wall energy between the second and third magnetic thin films 2 and 3. Then the condition for not causing directional inversion of the magnetization of the third magnetic thin film 3 is given by $$\sigma\omega 2 - 2Ms3.h3.Hex < 2Ms3.h3.Hc3 \quad (11)$$

The condition for inducing a transition from the state G to the state C is expressed as $$\sigma\omega 2 - \sigma\omega 1 - 2Ms2.h2.Hex > 2Ms2.h2.Hc2 \quad (12)$$

And the condition for inducing a transition from the state G to the state B is expressed as $$\sigma\omega 2 - \sigma\omega 1 - 2Ms2.h2.Hex < 2Ms2.h2.Hc2 \quad (13)$$

Therefore, when the conditions of Eqs. (11) and (12) are both satisfied, it follows that the state C is obtained at room temperature without the necessity of applying any particular external magnetic field other than the external magnetic field Hex.

Meanwhile, when the conditions of Eqs. (11) and (13) are both satisfied, application of another external magnetic field Hsub in the positive direction as shown in FIG. 1 to initialize the medium is required for inducing a transition from the state B to the state C at room temperature. In this case, the magnetic field Hsub is so set as to satisfy the following equations:

$$2Ms2.h2.Hsub + \sigma\omega 2 - \sigma\omega 1 > 2Ms2.h2.Hc2 \quad (4)$$

$$-2Ms3.h3.Hsub + \sigma\omega 2 < 2Ms3.H3.Hc3 \quad (15)$$

Viewing now Eq. (14) alone on condition that Eq. (15) is satisfied, then it may be expressed as $$H\text{sub} > Hc2 + \frac{\sigma\omega 1}{2Ms2 \cdot h2} - \frac{\sigma\omega 2}{2Ms2 \cdot h2} \quad (16)$$

Due to such transition to the state C, the magnetizations of the second and third magnetic thin films 2 and 3 corresponding to the TM spins therein are in the positive direction which is the same as in the initial state A, so that when a temperature modulation is executed in accordance with the next data to be recorded with a temperature rise to the first or second temperature T1 or T2, a transition to the state E is induced as in the case from the initial state, thereby enabling an overwrite operation.

(e) Embodiment 2

Figure 6:
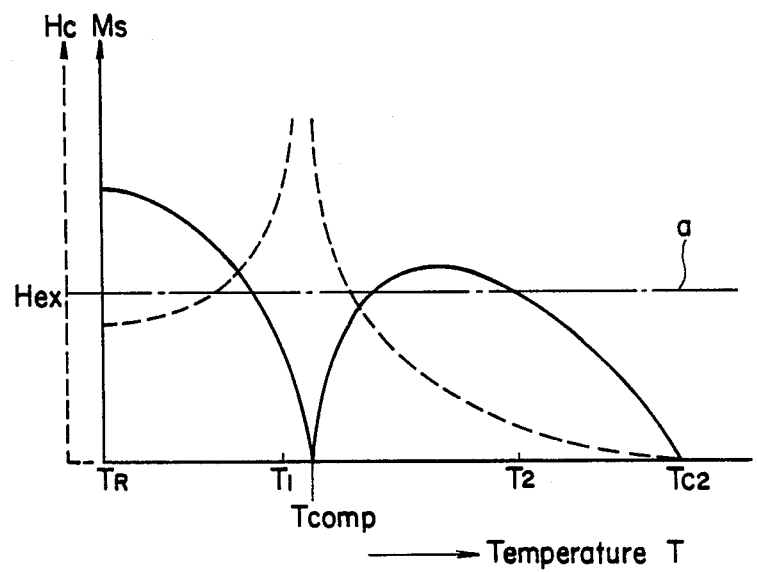
FIGS. 6 and 13 graphically show magnetization and coersive force-to-temperature characteristics.

In the embodiment 1 mentioned above, the magnetic thin films 1 and 2 are composed of TM-RE magnetic alloys where a compensation point Tcomp is not existent in a range from the room temperature TR to the second temperature T2. In this embodiment 2, however, the second magnetic thin film 2 has a compensation point Tcomp between the room temperature TR and the Curie point Tc2 thereof as graphically shown in FIG. 6 where the saturation magnetization Ms and the coercive force Hc are represented respectively by a solid-line curve and a broken-line curve. The second magnetic thin film 2 presents, at any temperature below the compensation temperature Tcomp, so-called RE-rich characteristic where the RE sublattice magnetization is dominant; and at any temperature above the compensation point Tcomp, so-called TM-rich characteristic where the TM sublattice magnetization is dominant; The compositions of the magnetic thin films 1 to 4 constituting the thermomagnetic recording medium 10 are listed in Table 1 below.

TABLE 1

| Magnetic thin film | Material | Curie point (°C.) | Magnetization (emu/cc) | Coercive force (KOe) | Thickness (Å) |
|---|---|---|---|---|---|
| 1st | TbFeCo | 150 | 100 | 12 | 500 |
| 2nd | GdTbFeCo | 210 | 100 | 1 | 300 |
| 3rd | TbFeCo | 150 | 150 | 7 | 500 |
| 4th | TbFe | 130 | — | — | 100 |

Figure 7:
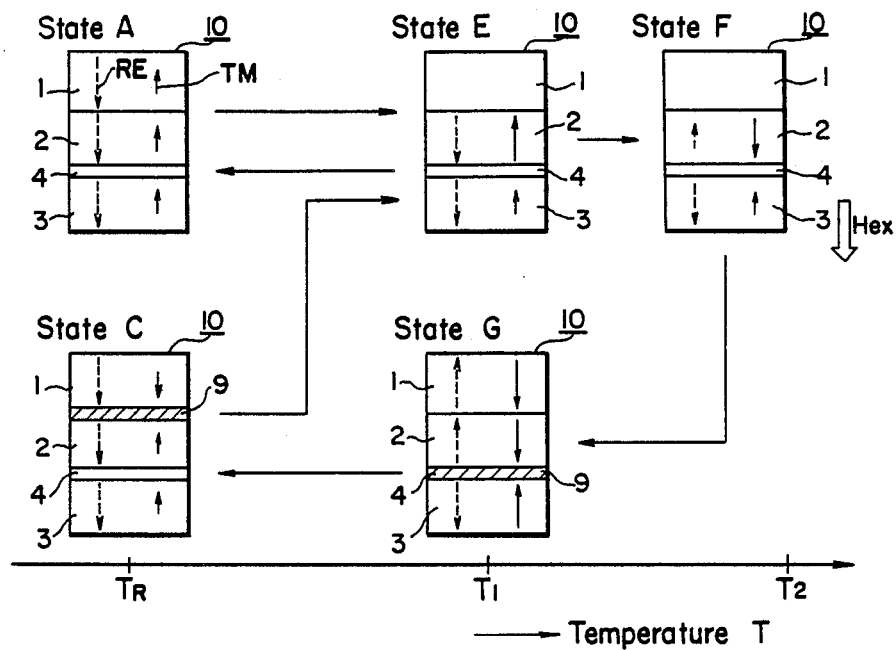

In this example, the exchange coupling energy $\sigma\omega 1$ exerted between the first and second magnetic thin films 1 and 2 at the room temperature TR is 1.7 erg/cm², and the exchange coupling energy $\sigma\omega 2$ between the second and third magnetic thin films 2 and 3 is 2.5 erg/cm². Using the thermomagnetic recording medium 10 of such composition, a data recording operation was performed in the same manner as in the foregoing embodiment 1 with the first temperature T1 set to 150° C. and the second temperature T2 to 250° C. FIG. 7 illustrates the states of magnetization obtained in the individual steps. In FIG. 7, any components corresponding to those in FIG. 1 are denoted by the same reference numerals, and a repeated explanation is omitted here. In this illustration, solid-line arrows relative to the magnetic thin films 1, 2 and 3 in the states A, E, F, G and C represent TM spins or TM magnetic moments, and broken-line arrows represent RE spins or RE magnetic moments. It has been confirmed that, according to the embodiment 2, sequential transitions of state A or C - state E - state A are induced in the heating step to the first temperature T1 and the subsequent cooling step, whereby a bit "0", for example, is recorded in the first magnetic thin film 1; and sequential transition of state A or C - state F - state G - state C are induced in the heating step to the second temperature T2 and the subsequent cooling step, whereby a bit "1", for example, is recorded.

In this case, the condition of Eq. (12) is satisfied when the coercive force Hc2 of the second magnetic thin film 2 at the room temperature TR becomes smaller than the external magnetic field Hex whose level is represented by a chain line in FIG. 6. Then, as illustrated in FIG. 7, a transition from the state G to the state C can be induced directly without the necessity of applying another external magnetic field Hsub in addition to the external magnetic field Hex.

The embodiments 1 and 2 mentioned above are examples where binary data recording is performed by transitions among the states A, B and C as described in connection with FIG. 4. However, a similar data recording operation can also be performed by transitions induced among the states A, B and D shown in FIG. 4. In the latter case, the states A, B and C in FIGS. 1 and 7 may be replaced with the states B, A and D, respectively.

(f) Embodiment 3 magnetic field Hex alone is applied.

Figure 8:
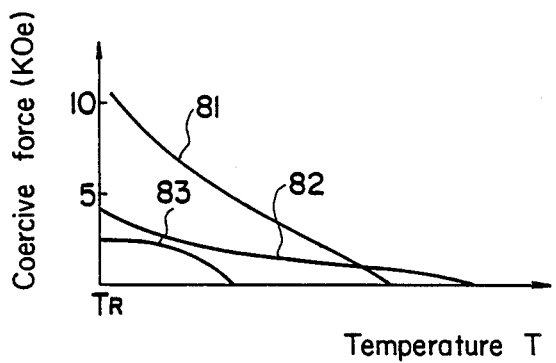
FIGS. 8 and 10 graphically shows exemplary coercive force-to-temperature characteristics of magnetic thin films.

The magnetic recording medium 10 used in this embodiment has first, second and third magnetic thin films 1, 2 and 3, whose coercive force-to-temperature characteristics are graphically represented by curves 81 to 83 respectively in FIG. 8. As shown, the first magnetic thin film 1 serving as a recorded-bit holding layer indicates a great coercive force at the room temperature TR. Meanwhile the second magnetic thin film 2 has the highest Curie point in comparison with the first and third magnetic thin films 1 and 3, and its sublattice magnetization is not inverted directionally in the vicinity of the Curie point of the first magnetic thin film 1. For example, the characteristic of the second magnetic thin film 2 is so selected that a coercive force of about 1 KOe is retained even in the vicinity of the Curie point Tc1 of the first magnetic thin film 1.

The first magnetic thin film 1 may be either TM-rich or RE-rich. The respective Curie points Tc1 to Tc3 of the first to third magnetic thin films 1 to 3 are so selected as to have a relationship of Tc3<Tc1<Tc2. Each of the second and third magnetic thin films 2 and 3 may be either TM-rich or RE-rich. However, in case the second magnetic thin film 2 has TM-rich characteristic in the vicinity of its Curie point Tc2, the third magnetic thin film 3 needs to be RE-rich immediately below the Curie point Tc3 thereof. And in case the second magnetic thin film 2 has RE-rich characteristic in the vicinity of its Curie point Tc2, the third magnetic thin film 3 needs to be TM-rich immediately below the Curie point Tc3 thereof. Exemplary compositions, thicknesses and characteristics of the magnetic thin films 1 to 3 are listed in Table 2 below.

TABLE 2

| Magnetic thin film | Composition | Coercive force (KOe) | Curie point (°C.) | Thickness (Å) |
|---|---|---|---|---|
| 1 | TbFeCo (Fe rich) | 10 | 180 | 500 |
| 2 | GdTbFeCo (Fe rich) | 3 | 300 | 500 |
| 3 | TbFe (Tb rich) | 2 | 130 | 2000 |

Figure 9:
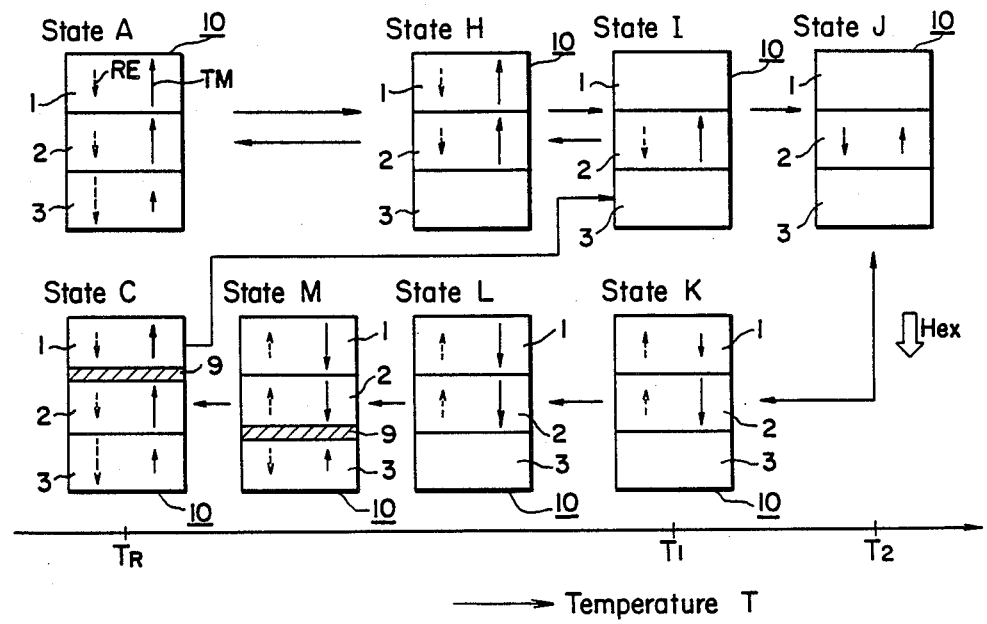

In this example, the first and second magnetic thin films 1 and 2 are Fe-rich, that is, TM-rich below the respective Curie points, and the third magnetic thin film 2 is Tb-rich, that is, RE-rich. The data recording process in this case will be described with reference to FIG. 9, where solid-line arrows relative to the magnetic thin films 1 to 3 typically represent TM spins or magnetic moments, and broken-line arrows typically represent RE spins or magnetic moments.

Due to binary data recording, the first and second temperatures T1 and T2 are so determined as to satisfy, for example, conditions of T1≃170° C. and T2≃270° C., wherein the first temperature T1 is proximate to the Curie point Tc1 of the first magnetic thin film 1 and the second temperature T2 is proximate to the Curie point Tc2 of the second magnetic thin film 2.

It is assumed now that the TM sublattice magnetizations of the first and second magnetic thin films 1 and 2 are both in the positive direction as in the initial state at the room temperature TR, that is, in the state A described in connection with FIG. 4.

In the embodiment 3 also, merely the external magnetic field Hex having an intensity of, for example, 500 (Oe) is applied in the same direction as the RE sublattice magnetizations of the first and second magnetic thin films 1 and 2 in the state A.

With rise of the recording medium temperature T up to the first temperature T1 in such state, the magnetization of the third magnetic thin film 3 is erased under the condition of T≧Tc3 as shown in the state H, and the magnetization of the first magnetic thin film 1 is also reduced or erased under the condition of T≃T1≃Tc1 as shown in the state I. However, since the second magnetic thin film 2 retains a required coercive force at the temperature T1, its magnetization is not inverted directionally by the external magnetic field Hex applied, so that in the cooling step subsequent to the heated state, TM and RE sublattice magnetizations of the same directions as in the initial state A are generated in the first magnetic thin film 1 by the exchange coupling force relative to the second magnetic thin film 2, whereby the state A is resumed to consequently record, e.g., binary data "0".

Meanwhile, when the recording medium temperature T has reached the second temperature T2, the magnetization of the second magnetic thin film 2 is erased completely or substantially as well as that of the first magnetic thin film 1 as shown in the state J, so that in the subsequent cooling step from the temperature T2, the respective TM sublattice magnetizations of the first and second magnetic thin films 1 and 2 are oriented in the same direction by the external magnetic field Hex and are thereby stabilized. With further fall of the temperature, the exchange coupling force is exerted between the first and second magnetic thin films 1 and 2 so that, as shown in the states K and L, the TM sublattice magnetization of the first magnetic thin film 1 is oriented to be directionally coincident with that of the second magnetic thin film 2. And with still further fall of the temperature to the vicinity of the Curie point Tc3 of the third magnetic thin film 3, the coercive force of the first magnetic thin film 1 is rendered considerably high and therefore the magnetization of the film 1 is stabilized and held in the state M where the magnetization is directionally inverse to the state A. At this time, the direction of the magnetization of the third magnetic thin film 3 is determined by a combination of the coercive force in the second magnetic thin film 2, the exchange coupling force exerted between the first and second magnetic thin films 1 and 2, and the intensity of the external magnetic field Hex. In the thermomagnetic recording medium 10 of the above-described structure, the magnetization is oriented in the direction of the applied external magnetic field Hex having an intensity of 500 Oe. That is, in the third magnetic thin film 3, its TM spin or TM sublattice magnetization is rendered directionally inverse to the TM sublattice magnetization of the first magnetic thin film 1 as shown in the state M. And a magnetic wall 9 is generated between the second and third magnetic thin films 2 and 3 in the state M where the magnetization of the second magnetic thin film 2 is directionally coincident with that of the third magnetic thin film 1. However, in the structure mentioned, it has been confirmed that the magnetic wall energy between the second and third magnetic thin films 2 and 3 at the room temperature TR is greater than the magnetic wall energy between the first and second magnetic thin films 1 and 2, whereby the TM sublattice magnetization of the second magnetic thin film 2 is oriented to be directionally coincident with that of the third magnetic thin film 3 by the exchange coupling force of the film 3, and therefore the state C is obtained at the room temperature TR. Thus, binary data "1" is recorded in the form of state C in the cooling step executed subsequently to the heating up to the second temperature T2.

When the temperature in the medium 10 including the recorded portion of such data "1" is heated to the temperature T1 or T2 for recording the next data, there occurs a transition to the state I from each of the states C and A since the TM and RE sublattice magnetizations of the second magnetic film 2 are directionally opposite to each other, so that binary data "0" or "1" can be recorded in an overwrite mode as described previously.

This embodiment 3 is an exemplary case where a binary data recording operation is performed in the form of states A and C shown in FIG. 4. However, it is also possible to record binary data similarly by replacing the states A and C of FIG. 4 with the states B and D, respectively. In this case, the direction of the applied external magnetic field Hex is so selected as to become opposite to the direction shown in FIG. 9.

(g) Embodiment 4

In this embodiment also, merely the external magnetic field Hex alone is applied.

Figure 10:
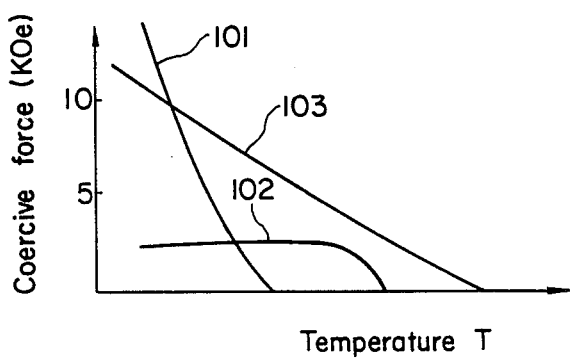

The magnetic recording medium 10 used in this embodiment has first, second and third magnetic thin films 1, 2 and 3, whose coercive force-to-temperature characteristics are graphically represented by curves 101 to 103 respectively in FIG. 10. As shown, the first magnetic thin film 1 serving as a recorded-bit holding layer indicates a great coercive force at the room temperature TR and has a low Curie point Tc1. Meanwhile the third magnetic thin film 3 has the highest Curie point Tc3 of all and retains a great coercive force in the vicinity of the Curie point Tc2 of the second magnetic thin film 2. That is, the respective Curie points Tc1 to Tc3 of the first to third magnetic thin films 1 to 3 are so selected as to have a relationship of Tc3 > Tc2 > Tc1, and the third magnetic thin film 3 is composed of a suitable material free from causing directional inversion of its magnetization in the data recording process. The second magnetic thin film 2 is composed of a material indicating a small coercive force at the room temperature TR as graphically shown in FIG. 10 and is so selected as to become TM-rich or RE-rich in such a manner that the TM sublattice magnetization thereof inverted by the external magnetic field Hex is rendered directionally opposite to the TM sublattice magnetization of the third magnetic thin film 3 maintained in a predetermined state of magnetization. The first magnetic thin film 1 may be either RE-rich or TM-rich.

Exemplary compositions, thicknesses and characteristics of the magnetic thin films 1 to 3 are listed in Table 3 below.

TABLE 3

| Magnetic thin film | Composition | Coercive force (KOe) | Curie point (°C.) | Thickness (Å) |
|---|---|---|---|---|
| 1 | TbFe (Fe rich) | 15 | ≃130 | 500 |
| 2 | GdTbFe (Tb rich) | 3 | ≃200 | 1000 |
| 3 | TbFeCo (Fe rich) | 12 | ≃300 | 500 |

Figure 11:
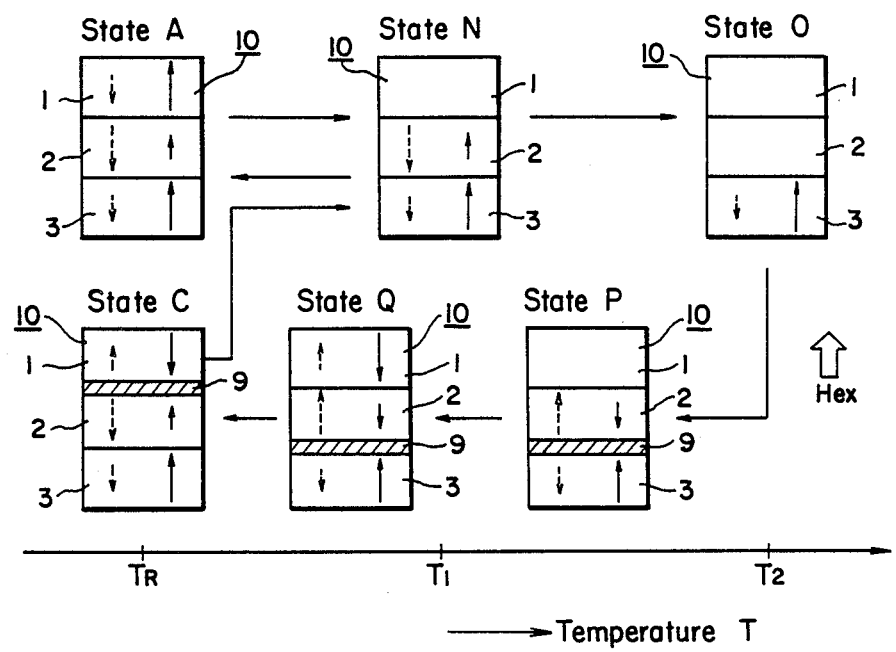

In this example, the first and third magnetic thin films 1 and 3 are Fe-rich, that is, TM-rich below the respective Curie points, and the second magnetic thin film 2 is Tb-rich, that is, RE-rich. The data recording process in this case will be described with reference to FIG. 11, where solid-line arrows relative to the magnetic thin films 1 to 3 typically represent TM spins or magnetic moments, and broken-line arrows typically represent RE spins or magnetic moments.

Due to binary data recording, the first and second temperatures T1 and T2 are so determined as to satisfy, for example, conditions of T1≃130° C. and T2≃200° C., wherein the first temperature T1 is proximate to the Curie point Tc1 of the first magnetic thin film 1 and the second temperature T2 is proximate to the Curie point Tc2 of the second magnetic thin film 2.

It is assumed now that the first and second magnetic thin films 1 and 2 initialized at the room temperature TR are in the state A described in connection with FIG. 4, and the TM spin of the third magnetic thin film 3 is selected to be directionally coincident with the TM spins of the first and second magnetic thin films 1 and 2. And in this embodiment 4 also, the required external magnetic field Hex is applied in the same direction as the TM sublattice magnetizations of the first and second magnetic thin films 1 and 2 in the state A.

With rise of the recording medium temperature T up to the first temperature T1 in such state, the magnetization of the first magnetic thin film 1 is erased or reduced in the vicinity of the Curie point Tc1, as shown in the state N. However, since the second and third magnetic thin films 2 and 3 retain required great coercive forces in such state as illustrated in FIG. 10, the respective TM and RE sublattice magnetizations are not inverted directionally by the applied external magnetic field Hex. Therefore, in the cooling step subsequent to the heating, TM and RE sublattice magnetizations of the same direction as in the initial state A are generated in the first magnetic thin film 1 by the exchange coupling force exerted relative to the second magnetic thin film 2, whereby the state A is resumed to consequently record, e.g., binary data "0".

Meanwhile, when the recording medium temperature T has reached the second temperature T2 proximate to the Curie point Tc2 of the second magnetic thin film 2, the magnetization of the second magnetic thin film 2 is erased completely or substantially as well as that of the first magnetic thin film 1 as shown in the state 0. But since the third magnetic thin film 3 retains a sufficiently great coercive force at such temperature, its magnetization is maintained in the predetermined direction even at the temperature T2 without being affected by the external magnetic field Hex.

However, with regard to the second magnetic thin film 2, the magnetization is oriented in the cooling step by the external magnetic field Hex to be directionally coincident therewith. That is, as shown in the state P, the TM sublattice magnetization of the second magnetic thin film 2 is rendered directionally opposite to the external magnetic field Hex and therefore becomes opposite to the third magnetic thin film 3 as well, so that an interface magnetic wall 9 is generated between the two magnetic thin films 2 and 3 since the second magnetic thin film 2 if Tb rich film dominant RE spin aligns along the external magnetic field direction. With further fall of the recording medium temperature T to the vicinity of the Curie point Tc1 of the first magnetic thin film 1 in the cooling step, there emerges a magnetization in the first magnetic thin film 1. In this stage, its TM sublattice magnetization is oriented to be directionally coincident with the TM sublattice magnetization of the second magnetic thin film 2 as shown in the state Q by properly selecting the temperature characteristic, thickness and so forth of the first magnetic thin film 1. And with still further fall of the temperature T, the coercive force of the first magnetic thin film 1 becomes greater to retain the magnetization thereof. The recording medium 10 is so constituted that a great exchange coupling force is exerted between the second and third magnetic thin films 2 and 3, that is, the magnetic wall energy between the first and second magnetic thin films 1 and 2 is selected to be smaller than the magnetic wall energy between the second and third magnetic thin films 2 and 3, whereby the sublattice magnetization of the second magnetic thin film 2 is directionally inverted to obtain the state C illustrated in FIG. 4, hence recording binary data "1".

When the temperature in the medium 10 including the recorded portion of such data "1" is heated up to the temperature T1 or T2 for recording the next data, there occurs a transition to the state N from each of the states A and C since the TM and RE sublattice magnetizations of the second magnetic thin film 2 are directionally opposite to each other, so that binary data "0" or "1" can be recorded in an overwrite mode as described previously.

This embodiment 4 is an exemplary case where a binary data recording operation is performed in the form of states A and C. However, it is also possible to record binary data similarly by replacing the states B and D of FIG. 4 with the states A and C of FIG. 11. In this case, the direction of the applied external magnetic field Hex is so selected as to become opposite to the direction shown in FIG. 11.

Although the above embodiments are concerned with exemplary cases where the thin films 1 to 4 are ferrimagnetic, it is to be noted that similar results are achievable by the use of ferromagnetic thin films as well.

(h) Embodiment 5

Figure 12:
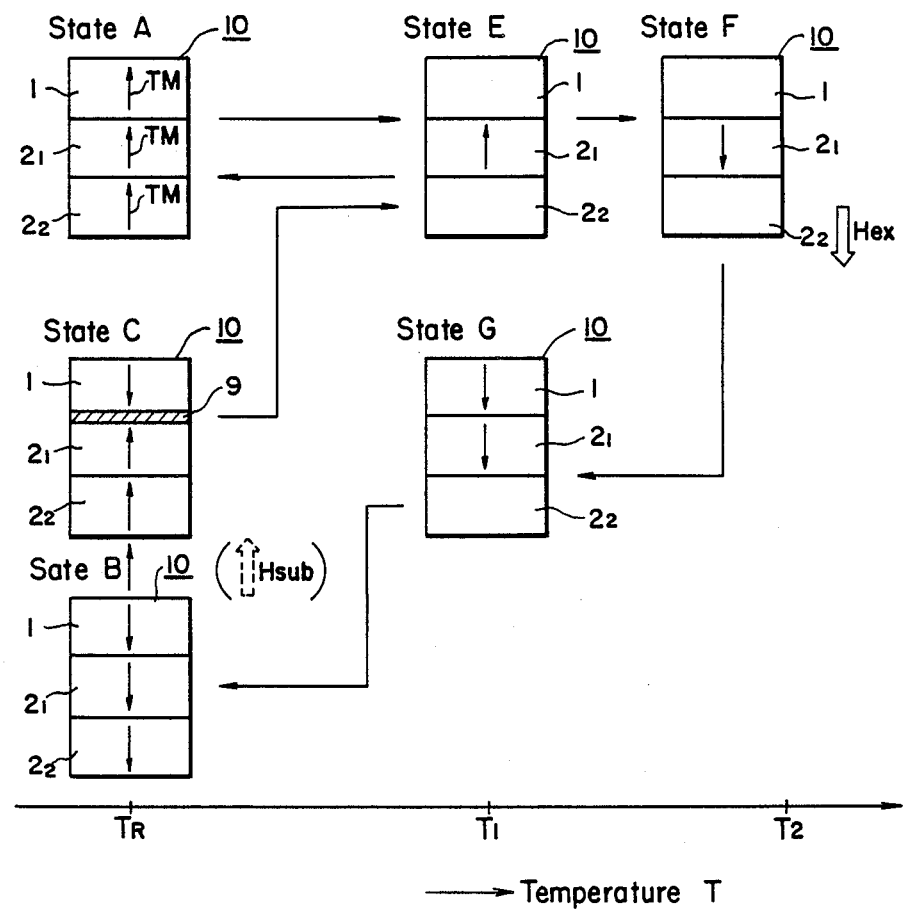

FIG. 12 illustrates how the state of magnetization changes in compliance with the temperature in the embodiment of the present invention. In this embodiment, the first magnetic thin film 1 and the two film parts $2_1$, $2_2$ of the second magnetic thin film 2 are composed of ferrimagnetic TM-RE alloy.

The magnetic thin films 1 and 2 ($2_1$, $2_2$) in this embodiment are deposited on the light transmissive base 5 directly by the use of a DC magnetron sputtering apparatus without forming a dielectric film 6, so that sequential layers of RE-TM ferrimagnetic thin films are obtained by sputtering. Such magnetic thin films 1, $2_1$ and $2_2$ are so arranged that RE and TM layers are superposed alternately. And a protective film 7 composed of $Si_3N_4$, AlN, $SiO_2$, SiO or $MgF_2$ is deposited to a thickness of 800 Å on the uppermost third magnetic thin film 3 as explained in connection with the previous embodiments.

The first and second magnetic thin films 1 and 2 ($2_1$, $2_2$) of the recording medium 10 in this embodiment are so-called TM-rich films in a range from room temperature to the respective Curie points Tc1 and Tc$2_1$, Tc$2_2$.

In the first magnetic thin film 1 and the first and second film parts $2_1$ and $2_2$ of the second magnetic thin film 2, the respective Curie points Tc1 and Tc$2_1$, Tc$2_2$ are so selected as to have the following relationship:

$$Tc2_2 < Tc1 < Tc_2 \tag{21}$$

In the description of this embodiment 5, as illustrated in FIG. 12, data are recorded by forming a portion of state A and a portion of state C or B in the thermomagnetic recording medium 10 shown in FIG. 4, i.e., a positive-direction portion and an inverse-direction portion with regard to the TM spins in the first magnetic thin film 1. In FIG. 12, the arrows relative to the magnetic thin films 1 and 2 (parts $2_1$, $2_2$) typically indicate the directions of the TM spins, and the magnetizations Ms1 and Ms$2_1$, Ms$2_2$ in the magnetic thin films 1 and 2 (parts $2_1$, $2_2$) correspond respectively to the difference between the TM and R magnetic moments therein since they are ferrimagnetic films.

It is assumed in this example that, when initialized at the room temperature TR, the first magnetic thin film 1 and the first film part $2_1$ of the second magnetic thin film 2 are in the state A where the respective TM spins are both in the positive direction, and the TM spin of the second film part $2_2$ is also in the same direction as in the first magnetic thin film 1 and the film part $2_1$.

Suppose now that the temperature T is raised to the first temperature T1 or the second temperature T2 from the initial state A at room temperature TR. The first temperature T1 is above the Curie point Tc1 of the first magnetic thin film 1 but is not so high as to invert the magnetization of the first film part $2_1$ of the second magnetic thin film 2 with application of an external magnetic field Hex which will be described later. The second temperature T2 is above the first temperature T1 and high enough to invert the TM sublattice magnetization of the film 2 with application of the external magnetic field Hex namely, near or higher than the Curie point Tc2, of the first film part.

After completion of the heating step at such temperature T1 or T2, a magnetization emerges in the first magnetic thin film 1 upon fall of the temperature T below the Curie point Tc1, and with regard to determination of the direction of such magnetization, the exchange coupling force exerted between the magnetic thin film 1 and the magnetic thin film part $2_1$ becomes dominant. That is, the saturation magnetization Ms1 and the thickness h1 of the first magnetic thin film 1 relative to the external magnetic field Hex and the interface magnetic wall energy $\sigma\omega1$ are so selected as to substantially satisfy the following conditions at the temperature T (proximate to Tc1) where a spontaneous magnetization emerges in the first magnetic thin film 1:

$$\sigma\omega1 > 2 \,|Ms1|\,h1\,Hex \tag{25}$$

Then the state of magnetization caused upon fall of the recording medium temperature T below the Curie point Tc1 is such that the TM sublattice magnetizations in the first magnetic thin film 1 and the film part $2_1$ of the second magnetic thin film 2 are directionally coincident with each other as in the state A or B illustrated in FIG. 4. And the state A is obtained when the temperature in the heating step is T1, or the state B is obtained when the temperature is T2.

The state E in FIG. 12 shows the state where the magnetizations of the first magnetic thin film 1 disappeared and the first film part $2_1$ of the second magnetic thin film 2 with rise of the recording medium temperature T up to the first temperature T1. And upon fall of the temperature T substantially below the Curie point Tc1 of the first magnetic thin film 1 in the subsequent cooling step, the TM sublattice magnetization of the first magnetic thin film 1 is oriented to be directionally coincident with that of the first film part $2_1$ of the second magnetic thin film 2 by the exchange coupling force of the film 2 as described previously, so that the initial state A in FIG. 12 is obtained to form a recorded portion of, e.g., binary data "0".

The state F in FIG. 12 is obtained when the magnetizations of the first and second magnetic thin films 1 and 2 are once erased or reduced due to rise of the temperature T up to the second temperature T2 and then the TM sublattice magnetization of the first film part $2_1$ of the second magnetic thin film 2 is inverted by the external magnetic field Hex applied with fall of the temperature T substantially to the Curie point Tc$2_2$ of the second film part $2_2$ of the second magnetic thin film 2. And with further fall of the temperature T to the vicinity of the Curie point Tc1 of the first magnetic thin film 1, the TM sublattice magnetization, which is in the inverse direction as in the first film part $2_1$ of the second magnetic thin film 2, is generated in the first magnetic thin film 1 by the exchange coupling force of the first film part $2_1$, as shown in the state G. When the temperature T still further falls in the cooling step to the room temperature TR from the state G, there is obtained the state B where the TM sublattice magnetization of the first magnetic thin film 1 is directionally inverted to record, e.g., binary data "1". In such transition to the state B, the TM spin of the second film part $2_2$ is rendered directionally coincident with the TM spin of the first film part $2_1$ by the exchange coupling force of the first film part $2_1$.

And a next transition is induced from the state B to the state C by applying another or second external magnetic field Hsub in addition to the aforementioned or first external magnetic field Hex. Then the TM sublattice magnetizations of the magnetic thin film 1 and the magnetic thin film part $2_1$ are rendered directionally opposite to each other with respect to the interface therebetween, whereby an interface magnetic wall 9 is generated. Regarding the magnetic wall energy $\sigma\omega$, the effective coercive force Hc2 of the second magnetic thin film 2, its saturation magnetization Ms2 and its thickness h2, the condition required for inducing a transition from the state B to the state C is expressed as $$Hsub > Hc2 + \frac{\sigma\omega}{2Ms2_1 h2_1 + 2Ms2_2 h2_2} \quad (31)$$

Meanwhile the effective coercive force Hc2 is given by $$Hc2 = \frac{Ms2_1 h2_1 Hc2_1 + Ms2_2 h2_2 Hc2_2}{Ms2_1 h2_1 + Ms2_2 h2_2} \quad (32)$$

In the above equation, $Ms2_1$ and $Ms2_2$, $h2_1$ and $h2_2$, $Hc2_1$ and $Hc2_2$ represent the saturation magnetizations, thicknesses and coercive forces of the first and second magnetic thin film parts $2_1$ and $2_2$, respectively.

As is obvious from Eq. (32), the coercive force Hc2 can be reduced in comparison with the value in a single-layer structure having the magnetic thin film part $2_1$ alone, so that the second magnetic field Hsub defined by Eq. (31) for inducing a transition from the state B to the state C can be diminished as compared with the recording medium where the magnetic thin film 2 is formed of the first film part $2_1$ alone.

For example, in case the first magnetic thin film 1 is composed of TM-rich TbFe (Hc1≳2.5 kOe) to have a thickness of 1000 Å and the second magnetic thin film 2 is composed of TM-rich TbFeCo (Hc2≳7 kOe) to have a thickness of 1000 Å, the intensity of the second magnetic field Hsub needs to be 8 kOe or more. In contrast therewith, according to the method of the present invention, the magnetic field Hsub can be reduced to 4 kOe or so in an example where the second magnetic thin film 2 is formed of the first film part $2_1$ mentioned above and the second film part $2_2$ composed of TM-rich DyFeCo alloy (Hc2$_2$≳1 kOe) to have a thickness of 2000 Å.

(i) Embodiment 6

Figure 13:
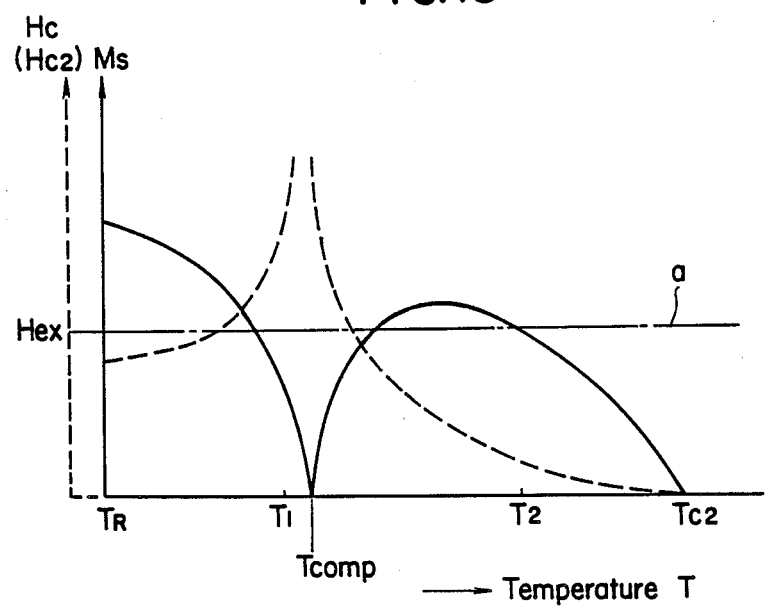
Figure 14:
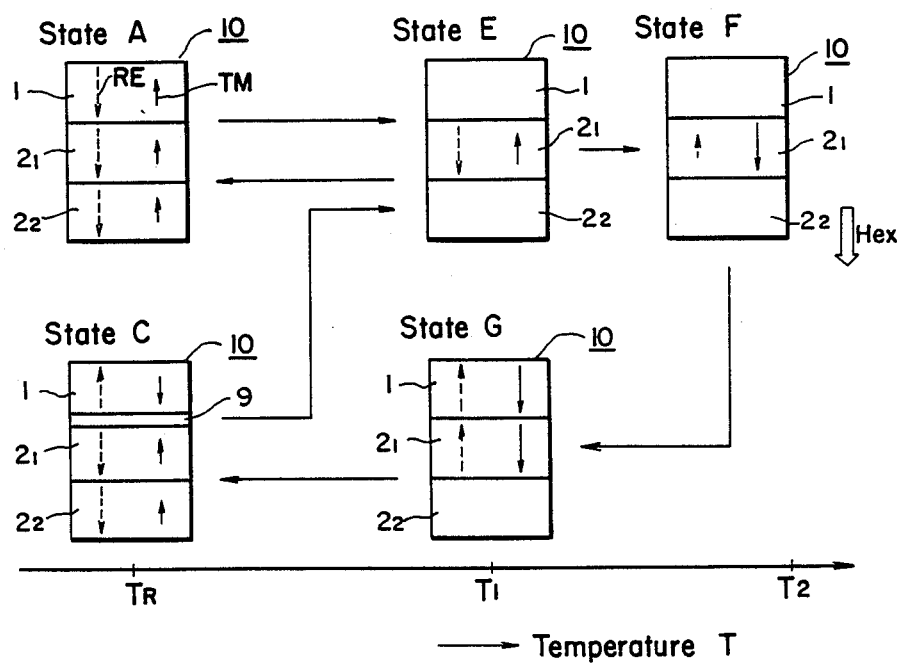

In the embodiment 5 described above, the magnetic thin films 1 and 2 are composed of TM-RE magnetic metals where a compensation point Tcomp is not existent in a range from the room temperature TR to the second temperature T2. In this embodiment 2, however, the first film part $2_1$ of the second magnetic thin film 2 has a compensation point Tcomp between the vicinity of the Curie point Tc1 of the first magnetic thin film 1 or the vicinity of the first temperature T1 and the second temperature T2 or below as graphically shown in FIG. 13 where the saturation magnetization Ms and the coercive force Hc are represented respectively by a solid-line curve and a broken-line curve. The first film part $2_1$ of the second magnetic thin film 2 presents, at any temperature below the compensation point Tcomp, so-called RE-rich characteristic where the RE sublattice magnetization is dominant; and at any temperature above the compensation point Tcomp, so-called TM-rich characteristic where the TM sublattice magnetization is dominant. FIG. 14 illustrates the states of magnetization obtained in the individual steps. In FIG. 14, any components corresponding to those in FIG. 12 are denoted by the same reference numerals, and a repeated explanation is omitted here. In this illustration, solid-line arrows relative to the magnetic thin film 1 and the film parts $2_1$, $2_2$ in the states A, E, F, G and C represent TM spins or TM magnetic moments, and broken-line arrows represent RE spins or RE magnetic moments.

According to the embodiment 6, sequential transitions of state A or C - state E - state A are induced in the heating step to the first temperature T1 and the subsequent cooling step, whereby a bit "0", for example, is recorded in the first magnetic thin film 1; and sequential transitions of state A or C - state F - state G - state C are induced in the heating step to the second temperature T2 and the subsequent cooling step, whereby a bit "1", for example, is recorded.

In this case, the condition of Eq. (31) is satisfied by the external magnetic field Hex at the room temperature TR whose level is represented by a chain line in FIG. 13. Then, as illustrated in FIG. 14, a transition from the state G to the state C can be induced directly without the necessity of applying another external magnetic field Hsub in addition to the first external magnetic field Hex.

The embodiments 5 and 6 mentioned above are examples where binary data recording is performed by transitions among the states A, B and C as described in connection with FIG. 4. However, a similar data recording operation can also be performed by transitions induced among the states A, B and D shown in FIG. 4. In the latter case, the states A, B and C in FIGS. 12 and 14 may be replaced with the states B, A and D, respectively.

It is to be noted that the individual magnetic thin films of the recording medium 10 may be composed of ferromagnetic material as well.

According to the recording method of the present invention, as is obvious from the above description, there are attainable a variety of advantages including realization of a higher data transfer rate due to the non-necessity of an erasing step (time), a compact structure accomplished without adoption of a two-head system requiring an erasing head, a fast recording operation based on the capability of thermal modulation using laser light or the like without modulation of an external magnetic field, and remarkable simplification of the apparatus contrived in combination with employment of a single laser light beam.

Furthermore, as is manifest in view of the individual embodiments mentioned, the existence of the third magnetic thin film 3 enables a binary data recording operation in an overwrite mode as well in the present invention merely by the use of an external magnetic field Hex alone without applying any other external magnetic field. And even when an additional magnetic field Hsub is required to induce a transition from the state B to the state C as in the embodiment 1 described with reference to FIG. 1, the intensity of such external magnetic field Hsub can be reduced in comparison with that in the conventional thermomagnetic recording method employing merely the first and second magnetic thin films 1 and 2 as disclosed in, for example, U.S. Ser. No. 87,440. According to the known thermomagnetic recording method described therein, magnetic layers formed in the structure of the recording medium are only the first and second magnetic thin films 1 and 2 in the embodiment 1 of FIG. 1 in the present invention, so that the intensity of the external magnetic field Hsub required for inducing a transition from the state B to the state C in FIG. 4 is given by $$Hsub > Hc2 + \sigma\omega/2Ms2 \; h2 \tag{161}$$

Since the intensity in the embodiment 1 is based on the aforementioned conditional equation (16), as is obvious from the comparison of Eqs. (161) and (16), the magnetic field Hsub according to Eq. (16) can be reduced by a value of the term $\sigma\omega_2/2Ms_2 \; h2$ as compared with that according to Eq. (161).

Furthermore, in case the recording medium is such that the magnetic layers thereof include merely first and second magnetic films 1 and 2 as mentioned hereinabove and the second magnetic thin film 2 is not so composed that a compensation temperature Tcomp is existent between the room temperature TR and its Curie point Tc2, it is necessary to prevent directional inversion of the magnetization in the second magnetic thin film 2 at the first temperature T1 which is in the vicinity of the Curie point Tc1 of the first magnetic thin film 1. Therefore, the coercive force Hc2 of the second magnetic thin film 2 practically needs to be greater than 1 kOe or so. In any material suited to satisfy such condition, the coercive force Hc2 at the room temperature TR amounts to more than 2 kOe or so, and consequently the second external magnetic field Hsub with addition of the term $\sigma\omega/2Ms_2 \; h2$ is Eq. (161) comes to require a great intensity of at least 3 to 4 kOe. However, it is practically difficult to produce a satisfactory apparatus capable of applying such magnetic field Hsub simultaneously or sequentially to the entire area of the recording medium 10.

Besides the above, in the recording medium where its magnetic layers include merely the first and second magnetic thin films 1 and 2 alone as in U.S. Ser. No. 87,440, if a compensation temperature Tcomp is existent between the room temperature TR and the Curie point Tc2 of the second magnetic thin film 2, then the second external magnetic field Hsub can be rendered coincident with the first external magnetic field Hex, and therefore it becomes practically nonnecessary to provide the additional magnetic field Hsub in particular. In this case, for enabling the first magnetic thin film 1 to exert its exchange coupling force on the second magnetic thin film 2 at the first temperature T1 in the vicinity of the Curie point Tc1 of the first magnetic thin film 1, the magnetic field required for causing directional inversion of the magnetization in the second magnetic thin film 2 at the room temperature TR needs to have an intensity of about 2 kOe or more according to Eq. (161), whereas the intensity of the external magnetic field Hex is at most 1 kOe or less. Consequently, for reducing the former field intensity, it becomes necessary to increase the film thickness or to set a higher temperature relative to directional inversion of the magnetization in the second magnetic thin film 2 so as to enhance the magnetization Ms at the room temperature TR. Then there may eventually arise some problems including the requisite of a greater recording power and so forth. According to the present invention, however, such problems can also be solved by using the improved magnetic recording medium 10 furnished with the third magnetic thin film 3.

Furthermore, as is manifest in view of the embodiments 5 and 6 mentioned, the double-layer structure of the second magnetic thin film 2 is effective to reduce the required intensity of the external magnetic field Hex in comparison with the conventional method using a single-layer second magnetic thin film as disclosed in U.S. Ser. No. 87,440. And the present invention enables a binary data recording operation in an overwrite mode as well merely by using the external magnetic field Hex alone without applying any other external magnetic field. And even when an additional magnetic field Hsub is employed to induce a transition from the state B to the state C as in the embodiment 1 described with reference to FIG. 1, it is possible to diminish the required intensity of such external magnetic field Hsub.

We claim as our invention:

1. A thermomagnetic recording method using a thermomagnetic recording medium where first, second and third magnetic thin films each formed of rare-earth and transition metals are sequentially superposed to form layers in a magnetically coupled manner; heating said thermomagnetic recording medium under a predetermined magnetic field perpendicular to the film plane thereof while selectively modulating, in accordance with data to be recorded, a first heating state at a first temperature $T_1$ substantially above the Curie point $Tc_1$ of said first magnetic thin film and adequate to hold the sublattice magnetization of the transition metal of said second magnetic thin film in a predetermined direction, and a second heating state at a second temperature $T_2$ substantially above said Curie point $Tc_1$, and adequate to invert the sublattice magnetization of the transition metal of said second magnetic thin film to the reverse of said predetermined direction; and in a cooling step subsequent to said first and second heating states, maintaining the sublattice magnetization of said third magnetic thin fill in a predetermined direction while orienting the sublattice magnetization of said second magnetic thin film to be directionally coincident with that of said third magnetic thin film at a temperature below said first temperature $T_1$ without directionally inverting the sublattice magnetization of said first magnetic thin film thin representing data by said sublattice magnetization of said first magnetic thin film.

2. A thermomagnetic recording method using a thermomagnetic recording medium where first and second magnetic thin films each formed of rare-earth and transition metals are superposed to form layers in a magnetically coupled manner, said second magnetic thin film consisting of a first film part having a first Curie point $Tc2_1$ and disposed adjacent to said first magnetic thin film and a second film part having a second Curie point Tc2$_2$ lower than said first Curie point Tc2$_1$ and disposed on the reverse side with respect to said first film part, said first and second film parts each being composed of a composition chosen from the group consisting of a rear earth rich side composition in which the rare earth element is contained in said film parts in a larger amount than the amount of the magnetic compensational composition at the normal temperature and a transition metal rich side composition in which the transition metal element is contained in said film parts in a larger amount than the magnetic compensational composition at the normal temperature, and said first and second film parts being formed of the same side composition;

heating said thermomagnetic recording medium while selectively modulating, in accordance with data to be recorded, a first heating state at a first temperature T$_1$ substantially above the Curie point Tc$_1$ of said first magnetic thin film and adequate to hold the sublattice magnetization of the transition metal in said second magnetic thin film in a predetermined direction, or a second heating state at a second temperature T$_2$ substantially above said Curie point Tc$_1$ and adequate to invert the sublattice magnetization of the transition metal of said second magnetic thin film to the reverse of said predetermined direction; and in a cooling step subsequent to said first and second heating states, orienting the respective sublattice magnetizations of both parts of said second magnetic thin film in the same state.

3. The thermomagnetic recording method of claim 1, wherein said thermomagnetic recording medium further comprises a fourth layer which is interposed between said second and third magnetic thin film, said fourth layer interrupts magnetic coupling between said second and third magnetic thin films at heated condition.

4. The thermomagnetic recording method of claim 1, wherein said first and second magnetic films have an interface magnetic wall energy $\sigma\omega_1$ therebetween, and said second and third magnetic films have an interface magnetic wall energy $\sigma\omega_2$ therebetween, and said interface magnetic wall energy $a\omega_1$ is smaller than said interface magnetic wall energy $\sigma\omega_2$.

5. The thermomagnetic recording method of claim 1, wherein said predetermined magnetic field is applied by an external magnetic filed Hex, that satisfies the following conditions:

$$\sigma w_2 - 2Ms_3h_3Hex < 2Ms_3h_3Hc_3$$

$$\omega w_2 - \sigma w_1 - 2Ms_2h_2Hex < 2Ms_2h_2Hc_2$$

wherein:
    $\omega w_1$ represents an interface magnetic wall energy existing between said first and second magnetic thin films;
    $\omega w_2$ represents an interface magnetic wall energy existing between said second and third magnetic thin films;
    Ms$_2$ and Ms$_3$ represents the saturation magnetization of said second and third magnetic thin film respectively;
    h$_2$ and h$_3$ represent the thickness of said second and third magnetic thin films respectively; and
    Hc$_2$ and Hc$_3$ the coercive force of said second and third magnetic thin films respectively.

6. The thermomagnetic recording method of claim 1 wherein said predetermined magnetic field is applied by an external magnetic field Hex which satisfies the following conditions:

$$\sigma w_2 - 2Ms_3h_3Hex < 2Ms_3h_3Hc_3$$

$$\omega w_2 2Ms_2h_2Hex < 2Ms_2h_2Hc_2$$

wherein:
    $\omega w_1$ represents an interface magnetic wall energy existing between said first and second magnetic thin films;
    $\omega w_2$ represents an interface magnetic wall energy existing between said second and third magnetic thin films;
    Ms$_2$, Ms$_3$ represents the saturation magnetization of said second and third magnetic thin film respectively;
    h$_2$, h$_3$ represents the thickness of said second and third magnetic thin films respectively; and
    Hc$_2$, Hc$_3$ represents the coercive force of said second and third magnetic thin films respectively and another external magnetic field Hsub is applied to said thermomagnetic recording medium to maintain the sublattice magnetization of said third magnetic thin film in a predetermined direction while orienting the sublattice magnetization of said second magnetic thin film to be directionally coincident with that of said third magnetic thin film at a temperature below said first temperature T1 without directionally inverting the sublattice magnetization of said first magnetic thin film.

* * * * *